United States Patent
Dwivedi et al.

(10) Patent No.: US 11,947,629 B2
(45) Date of Patent: Apr. 2, 2024

(54) MACHINE LEARNING MODELS FOR AUTOMATED PROCESSING OF TRANSCRIPTION DATABASE ENTRIES

(71) Applicant: Evernorth Strategic Development, Inc., St. Louis, MO (US)

(72) Inventors: Akash Dwivedi, Chicago, IL (US); Christopher R. Markson, Hawthorne, NJ (US); Pritesh J. Shah, Paramus, NJ (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 395 days.

(21) Appl. No.: 17/464,213

(22) Filed: Sep. 1, 2021

(65) Prior Publication Data
US 2023/0068878 A1    Mar. 2, 2023

(51) Int. Cl.
| | |
|---|---|
| *G06F 18/214* | (2023.01) |
| *G06F 16/383* | (2019.01) |
| *G06F 40/295* | (2020.01) |
| *G10L 15/26* | (2006.01) |

(52) U.S. Cl.
CPC ........ *G06F 18/2148* (2023.01); *G06F 16/383* (2019.01); *G06F 40/295* (2020.01); *G10L 15/26* (2013.01); *G06F 2218/10* (2023.01)

(58) Field of Classification Search
CPC .. G06F 18/2148; G06F 16/383; G06F 40/295; G06F 2218/10; G06F 18/24; G06F 40/279; G06F 40/30; G10L 15/26
See application file for complete search history.

(56) References Cited

U.S. PATENT DOCUMENTS

| | | | |
|---|---|---|---|
| 9,626,629 B2 | 4/2017 | Vijayaraghavan | |
| 9,779,492 B1 | 10/2017 | Garnavi | |
| 10,311,377 B2 * | 6/2019 | Vijayaraghavan | ....... G06N 5/04 |
| 10,748,663 B2 | 8/2020 | Kalafatis | |
| 10,839,162 B2 | 11/2020 | Matthews | |
| 10,839,335 B2 | 11/2020 | Weisman | |
| 2003/0125945 A1 * | 7/2003 | Doyle | ..................... G10L 15/01 |
| | | | 704/E15.002 |
| 2016/0171505 A1 * | 6/2016 | Johri | .................... G06Q 30/016 |
| | | | 705/7.11 |
| 2019/0043487 A1 | 2/2019 | Rivkin | |

(Continued)

*Primary Examiner* — Linda Wong
(74) *Attorney, Agent, or Firm* — Miller Johnson

(57) ABSTRACT

A computer system includes processor hardware configured to execute instructions that include joining at least a portion of multiple call transcription data entries with at least a portion of multiple agent call log data entries according to timestamps associated with the entries to generate a set of joined call data entries, and validating the joined call data entry by determining whether a transcribed entity name matches with entity identifier information associated with the agent call log data entry. The instructions include preprocessing the joined call data entry according to word confidence score data entries associated with the call transcription data entry to generate preprocessed text, performing natural language processing vectorization on the preprocessed text to generate an input vector, and supplying the input vector to an unsupervised machine learning model to assign an output topic classification of the model to the joined call data entry associated with the input vector.

20 Claims, 10 Drawing Sheets

(56) References Cited

U.S. PATENT DOCUMENTS

| | | |
|---|---|---|
| 2019/0043506 A1 | 2/2019 | Rivkin |
| 2019/0115028 A1 | 4/2019 | Rivkin |
| 2019/0139551 A1 | 5/2019 | Steelberg |
| 2021/0409544 A1* | 12/2021 | Hernandez ............ G06F 40/205 |
| 2023/0222292 A1* | 7/2023 | Cohen .................... G06N 3/045 |
| | | 704/9 |

* cited by examiner

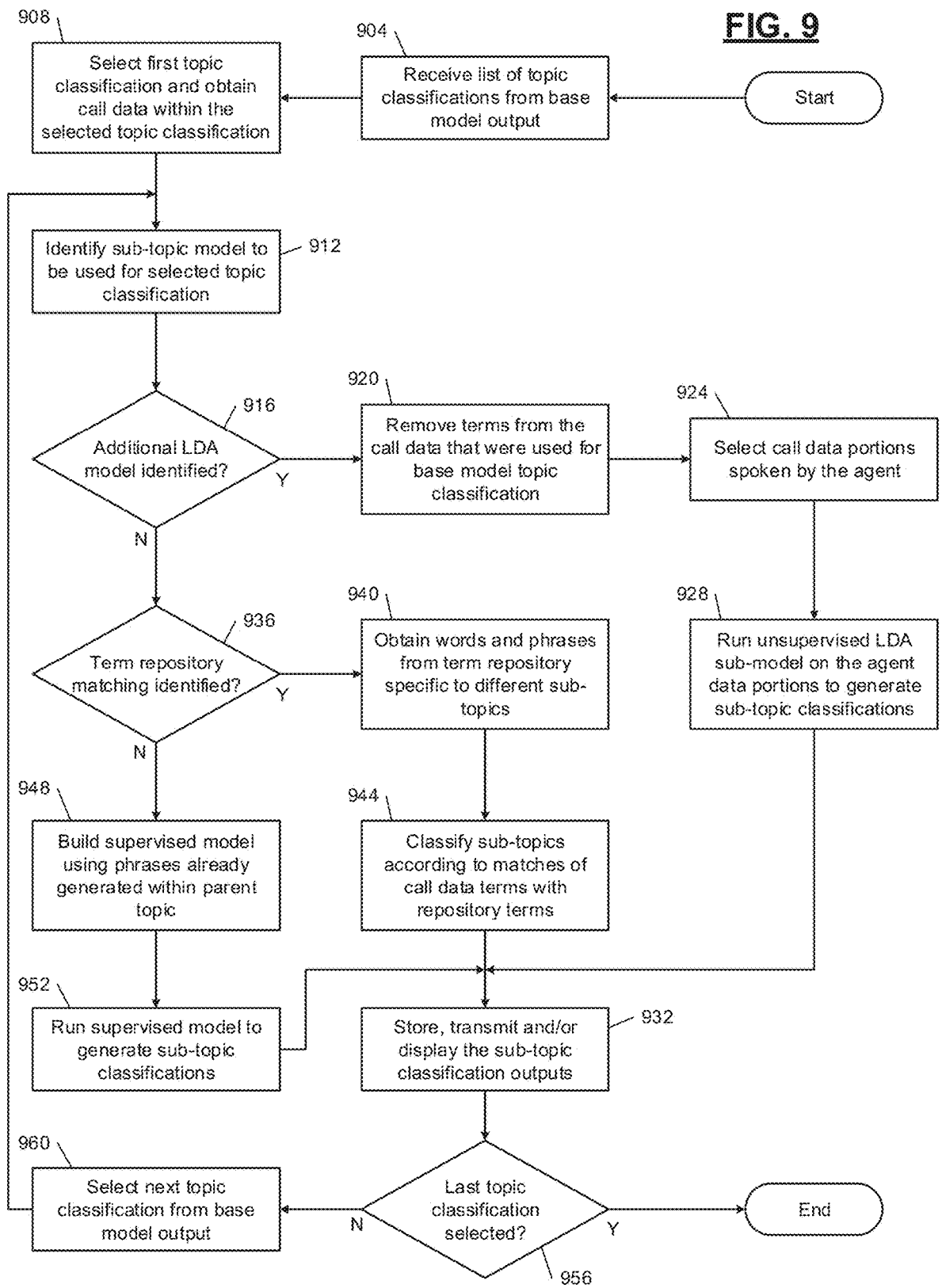

MACHINE LEARNING MODELS FOR AUTOMATED PROCESSING OF TRANSCRIPTION DATABASE ENTRIES

FIELD

The present disclosure relates to machine learning models for automated processing of transcription database entries.

BACKGROUND

Members of prescription drug plans sometimes call customer service agents to obtain assistance with problems related to their prescriptions or other issues. When analyzing member calls, it may be difficult to determine specific reasons for calls when using broad categories that limit the ability to detect trends or anomalies. A manual detailed root cause analysis for each call is time consuming and resource intensive.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory hardware configured to store a transcription database, a call database and computer-executable instructions. The transcription database includes multiple call transcription data entries and multiple word confidence score data entries associated with each call transcription data entry. The call database includes multiple agent call log data entries. The system includes processor hardware configured to execute the instructions. The instructions include joining at least a portion of the call transcription data entries with at least a portion of the agent call log data entries according to timestamps associated with the entries to generate a set of joined call data entries. Each of the set of joined call data entries includes one of the call transcription data entries paired with a corresponding one of the agent call log data entries. For each of the set of joined call data entries, the instructions include obtaining a transcribed entity name from the call transcription data entry, and validating the joined call data entry by determining whether the transcribed entity name matches with entity identifier information associated with the agent call log data entry in satisfaction of a matching threshold indicative of a likelihood that the transcribed entity name and the entity identifier information refer to the same entity. In response to a successful validation of the joined call data entry, the instructions include preprocessing the joined call data entry according to the word confidence score data entries associated with the call transcription data entry to generate preprocessed text. The preprocessing includes removing or replacing at least a portion of transcribed text of the call transcription data entry. The instructions include performing natural language processing vectorization on the preprocessed text to generate an input vector for an unsupervised machine learning model, and for each of at least a portion of the input vectors, supplying the input vector to the unsupervised machine learning model to assign an output topic classification of the model to the joined call data entry associated with the input vector, supplying the input vector to at least one sub-topic model associated with the output topic classification to assign one or more sub-topic output classifications to the joined call data entry associated with the input vector, and modifying a user interface of a user device to display the output topic classification and the one or more sub-topic output classifications.

In other features, performing natural language processing vectorization includes at least one of performing term frequency vectorization on the preprocessed text to generate the input vector, performing term frequency inverse document frequency (TF/IDF) vectorization on the preprocessed text to generate the input vector, and performing embedded vectorization on the preprocessed text to generate the input vector. In other features, the unsupervised machine learning model includes a Latent Dirichlet Allocation (LDA) model, and each output topic classification is assigned according to an output of the LDA model.

In other features, the instructions further include training the LDA model by running the LDA model on historical input vectors with different numbers of clusters for the LDA model, obtaining a perplexity score for each run of the LDA model with a different number of clusters, identifying a number of clusters corresponding to a target granularity according to the perplexity score, and setting a number of output topic classifications of the LDA model according to the identified number of clusters corresponding to the target granularity. In other features, supplying the input vector to at least one sub-topic model includes at least one of supplying the input vector to a sub-topic LDA model to generate the one or more sub-topic output classifications, generating the one or more sub-topic output classifications according to matching between the input vector and one or more terms in a sub-topic term repository, and supplying the input vector to a sub-topic supervised machine learning model to generate the one or more sub-topic output classifications.

In other features, the instructions include training the sub-topic supervised machine learning model by creating a training data set based on other joined call data entries within a same output topic classification that have one assigned sub-topic output classification, preprocessing the training data set to remove terms used for assigning the output topic classification and assigning the sub-topic output classification to each joined call data entry in the training data set for generation of a preprocessed training data set, and supplying the preprocessed training data set to the sub-topic supervised machine learning model to train the sub-topic supervised machine learning model using supervised learning. In other features, the instructions further include obtaining each word confidence score data entry by comparing an audio waveform of a word associated with transcribed text of a call transcription data entry to an audio waveform of a target corresponding word in an automated transcription application database.

In other features, the preprocessing includes, in response to a determination that a word confidence score associated with a word in the transcribed text is below a threshold indicative of a likelihood of an accurate transcription, searching for the word in a term repository of common incorrect transcriptions, replacing the word in the transcribed text according to the term repository in response to identifying the word in the term repository, and removing the word from the transcribed text in response to failing to identify the word in the term repository. In other features, each agent call log data entry includes at least one of a customer service system page viewed by an agent during a customer service call, and a customer service system link accessed by the agent during the customer service call.

In other features, determining whether the transcribed entity name matches with entity identifier information includes performing a fuzzy logic match between the transcribed entity name and an entity name in the entity identifier information associated with the agent call log data entry. The instructions further include, in response to a result of the fuzzy logic match being above the matching threshold, storing the joined call data entry in a matched call bin to indicate a successful validation, and in response to the result of the fuzzy logic match being below the matching threshold, storing the joined call data entry in an unmatched bin to indicate an unsuccessful validation.

In other features, preprocessing includes at least one of removing a word from transcribed text of the call transcription data entry in response to the word matching a corresponding entry on a stop word removal list, removing a portion of the transcribed text that was used for validation of the joined call data entry, and combining multiple words of the transcribed text into a single token. In other features, the instructions further include transmitting the output topic classification and the one or more sub-topic output classifications to another device.

A computerized method for automated processing of transcription database entries includes joining at least a portion of multiple call transcription data entries with at least a portion of multiple agent call log data entries according to timestamps associated with the entries to generate a set of joined call data entries. A transcription database stores the multiple call transcription data entries and multiple word confidence score data entries associated with each call transcription data entry. A call database stores the multiple agent call log data entries. Each of the set of joined call data entries includes one of the call transcription data entries paired with a corresponding one of the agent call log data entries. For each of the set of joined call data entries, the method includes obtaining a transcribed entity name from the call transcription data entry, and validating the joined call data entry by determining whether the transcribed entity name matches with entity identifier information associated with the agent call log data entry in satisfaction of a matching threshold indicative of a likelihood that the transcribed entity name and the entity identifier information refer to the same entity. In response to a successful validation of the joined call data entry, the method includes preprocessing the joined call data entry according to the word confidence score data entries associated with the call transcription data entry to generate preprocessed text. The preprocessing includes removing or replacing at least a portion of transcribed text of the call transcription data entry. The method includes performing natural language processing vectorization on the preprocessed text to generate an input vector for an unsupervised machine learning model, and for each of at least a portion of the input vectors, supplying the input vector to the unsupervised machine learning model to assign an output topic classification of the model to the joined call data entry associated with the input vector, supplying the input vector to at least one sub-topic model associated with the output topic classification to assign one or more sub-topic output classifications to the joined call data entry associated with the input vector, and modifying a user interface of a user device to display the output topic classification and the one or more sub-topic output classifications.

In other features, the method includes transmitting the output topic classification and the one or more sub-topic output classifications to another device. In other features, performing natural language processing vectorization includes at least one of performing term frequency vectorization on the preprocessed text to generate the input vector, performing term frequency inverse document frequency (TF/IDF) vectorization on the preprocessed text to generate the input vector, and performing embedded vectorization on the preprocessed text to generate the input vector.

In other features, the unsupervised machine learning model includes a Latent Dirichlet Allocation (LDA) model, and each output topic classification is assigned according to an output of the LDA model. In other features, the method includes training the LDA model by running the LDA model on historical input vectors with different numbers of clusters for the LDA model, obtaining a perplexity score for each run of the LDA model with a different number of clusters, identifying a number of clusters corresponding to a target granularity according to the perplexity score, and setting a number of output topic classifications of the LDA model according to the identified number of clusters corresponding to the target granularity.

In other features, supplying the input vector to at least one sub-topic model includes at least one of supplying the input vector to a sub-topic LDA model to generate the one or more sub-topic output classifications, generating the one or more sub-topic output classifications according to matching between the input vector and one or more terms in a sub-topic term repository, and supplying the input vector to a sub-topic supervised machine learning model to generate the one or more sub-topic output classifications. In other features, the method includes training the sub-topic supervised machine learning model by creating a training data set based on other joined call data entries within a same output topic classification that have one assigned sub-topic output classification, preprocessing the training data set to remove terms used for assigning the output topic classification and assigning the sub-topic output classification to each joined call data entry in the training data set for generation of a preprocessed training data set, and supplying the preprocessed training data set to the sub-topic supervised machine learning model to train the sub-topic supervised machine learning model using supervised learning. In other features, the method includes obtaining each word confidence score data entry by comparing an audio waveform of a word associated with transcribed text of a call transcription data entry to an audio waveform of a target corresponding word in an automated transcription application database.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 9 is a flowchart depicting an example process for generating sub-topic classifications of the topic classifications generated by the process of FIG. 8.

In the drawings, reference numbers may be reused to identify similar and/or identical elements.

DETAILED DESCRIPTION

High-Volume Pharmacy

Figure 1:
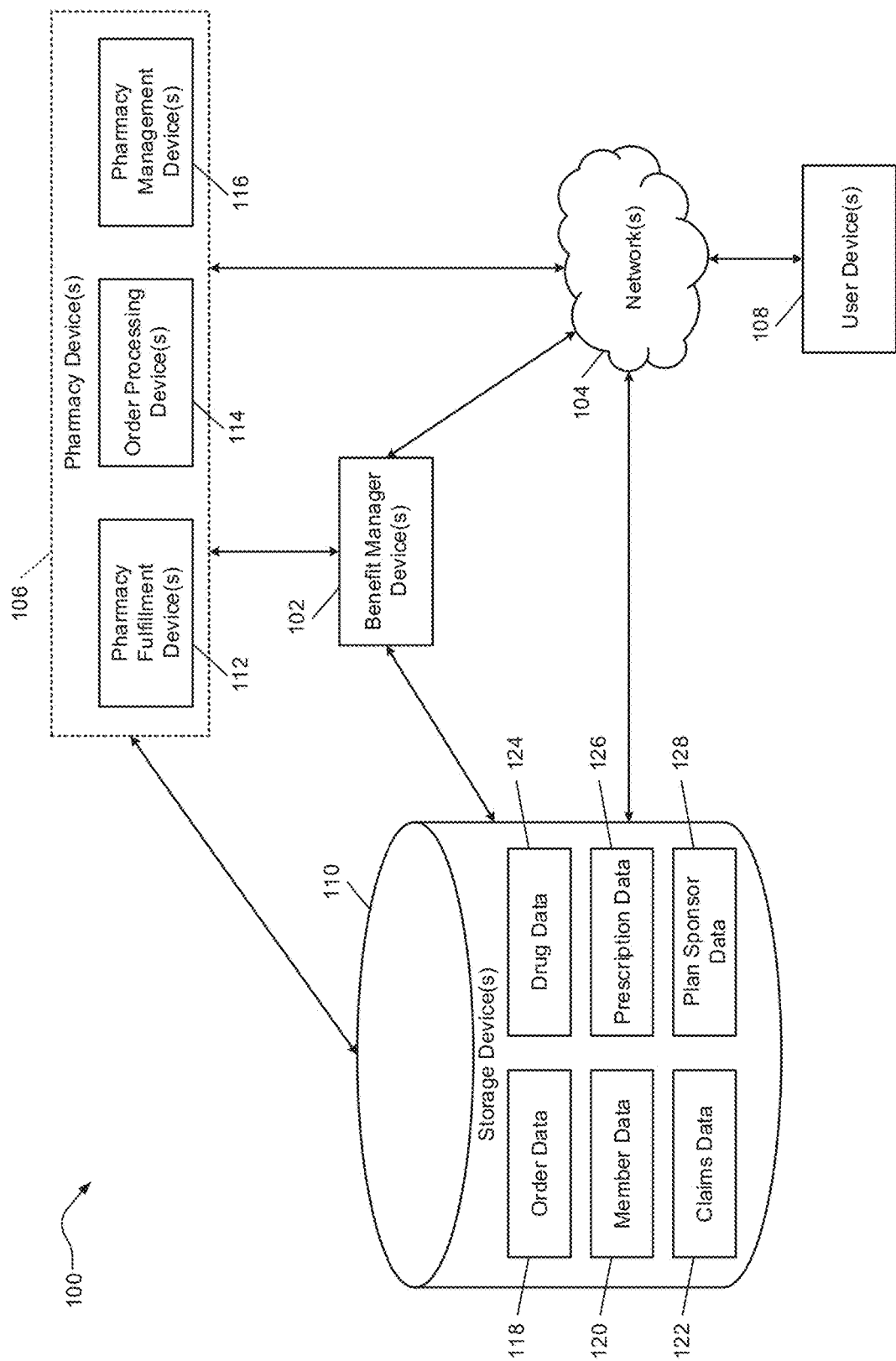
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
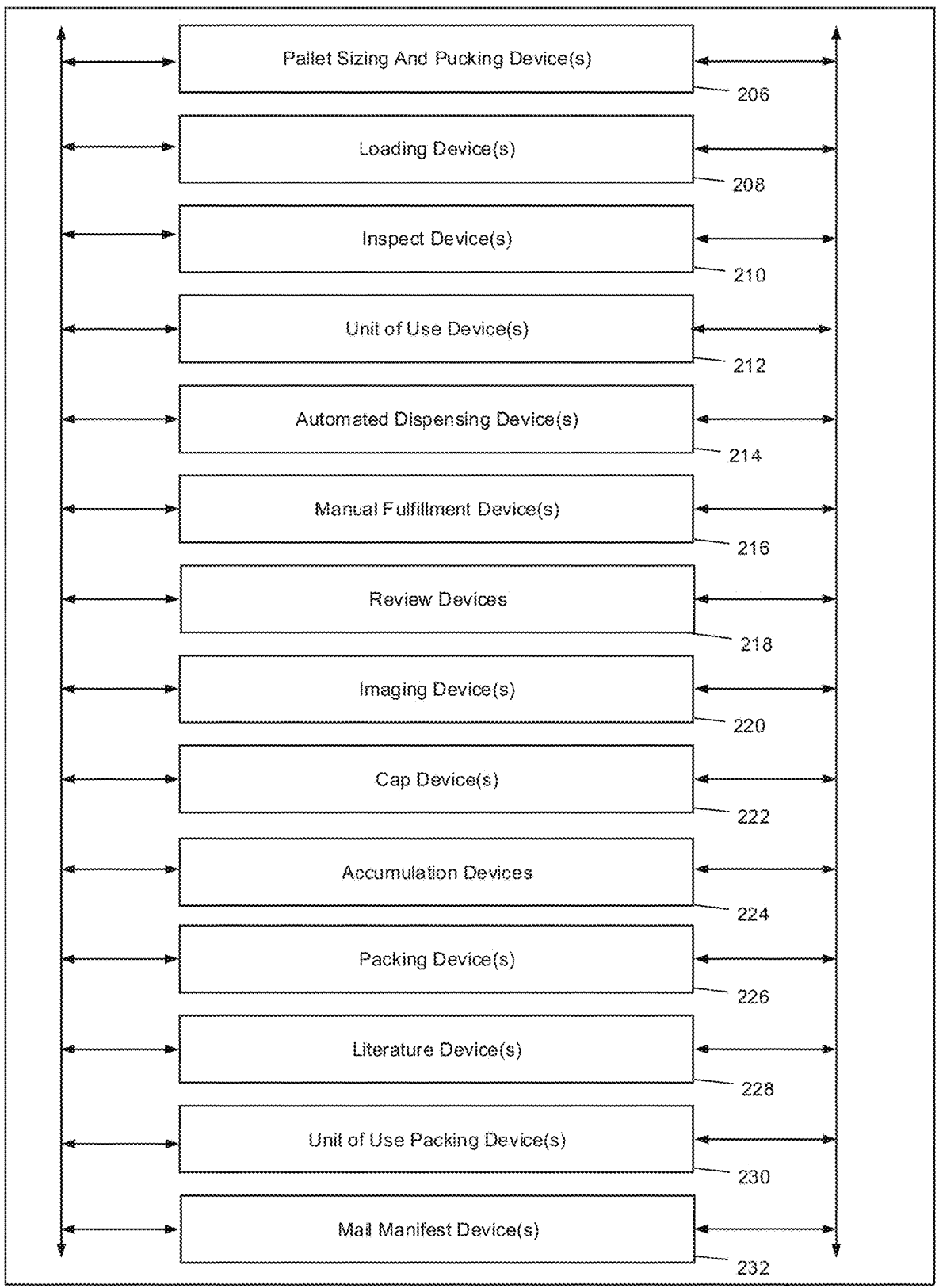
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
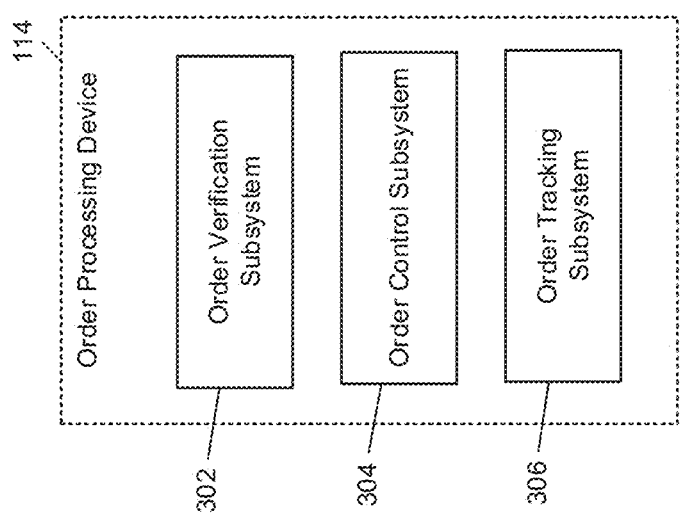
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver a pallet from the loading device 208 to the manual fulfillment device 216, to deliver a pallet from the loading device 208 to the automated dispensing device 214, and, to deliver paperwork from the literature device 228 to the packing device 226.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Automated Transcription Database Processing System

Figure 4:
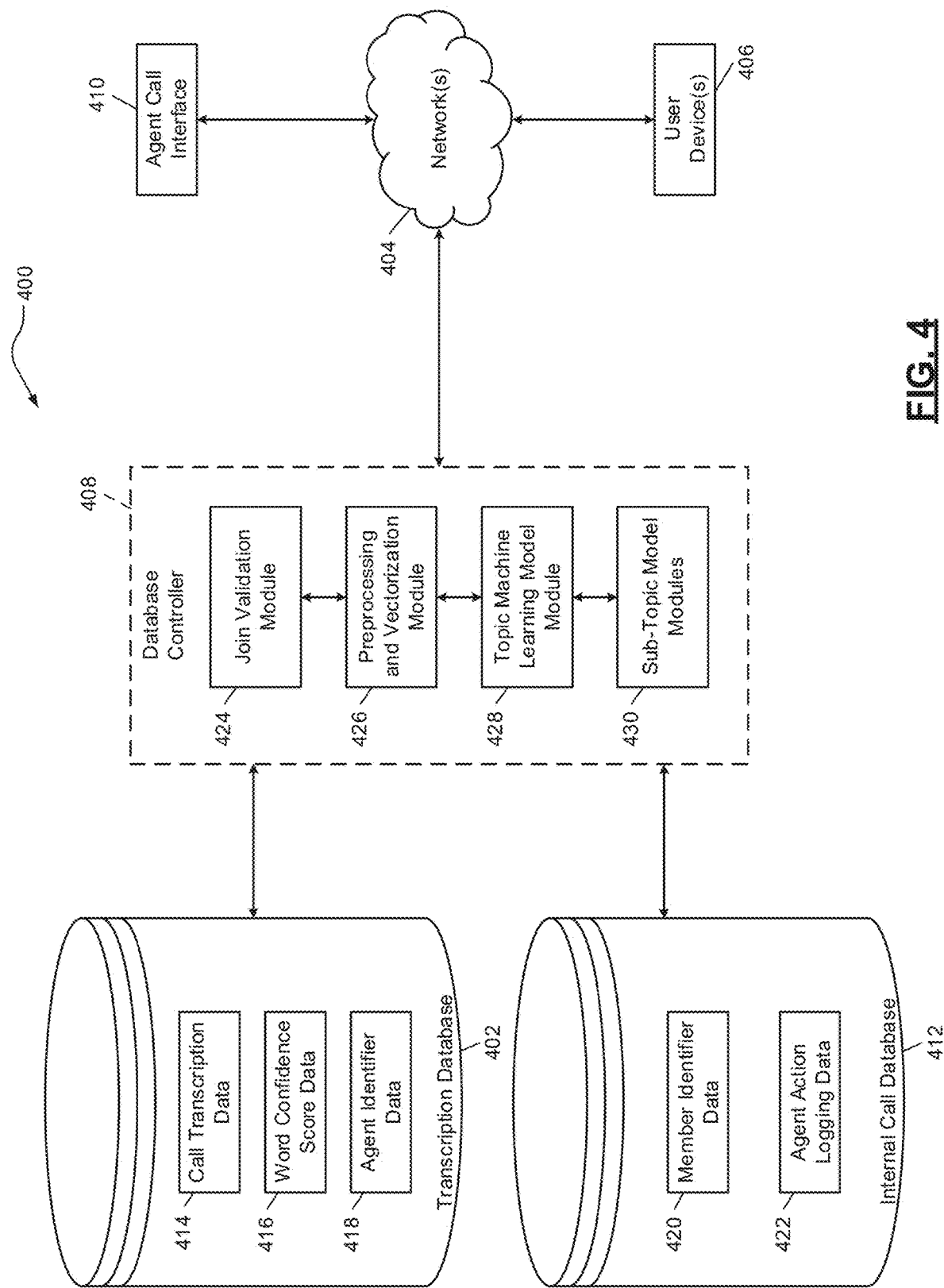
FIG. 4 is a functional block diagram of an example system for automated processing of transcription database entries.

FIG. 4 is a functional block diagram of an example system 400 for automated processing of transcription database entries. The system 400 includes multiple databases, which may be deployed in a computer network system. The system 400 may include one or more servers, desktop computers, laptop computers, tablets, or smartphones.

As shown in FIG. 4, the system 400 includes a transcription database 402 that stores call transcription data 414, word confidence score data 416, and agent identifier data 418. The call transcription data 414, word confidence score data 416, and agent identifier data 418 may be located in different physical memories within the transcription database 402, such as different random access memory (RAM), read-only memory (ROM), a non-volatile hard disk or flash memory. In some implementations, the call transcription data 414, word confidence score data 416, and agent identifier data 418 may be located in the same memory (such as in different address ranges of the same memory). The call transcription data 414, word confidence score data 416, and agent identifier data 418 may be stored in any suitable format, such as structured data entries of the transcription database 402.

In various implementations, the transcription database 402 may obtain data from different sources. For example, the call transcription data 414 may be obtained from an automated speech-to-text conversion application, which converts audio from member customer service calls into transcribed text. The word confidence score data 416 may be generated automatically by the conversion application or another application, and include confidence scores for the transcription text. For example, each word in the transcribed text may be assigned a confidence score indicating how closely the audio of the word matched an entry for a corresponding text word, which is representative of how confident the application is that the automated transcription correctly captured the actual word spoken by the member or a customer service agent.

The agent identifier data 418 may identify a specific customer service agent that handled each transcribed call based on, for example, an identifier of the agent, a time of the call, or a workstation that received the call. Although FIG. 4 illustrates three types of data stored in the transcription database 402, various implementations may include other suitable types of data associated with transcription of customer service calls.

The system 400 includes an internal call database 412 that stores member identifier data 420, and agent action logging data 422. The member identifier data 420 and agent action logging data 422 may be located in different physical memories within the internal call database 412, or may be located in the same memory. The member identifier data 420 and agent action logging data 422 may be stored in any suitable format, such as structured data entries of the internal call database 412.

The member identifier data 420 may include any suitable information associated with a member making a customer service call. For example, the member identifier data 420 may include an insurance membership number for the member, a social security number for the member, a name of the member, a date of birth of the member, and so on. This data may be obtained via input from the member during the call, may be based on looking up records for the member before, during or after the call, or any other suitable approach for obtaining member identification information (sometimes referred to as entity identifier information). The agent action logging data 422 may include actions taken by the agent during the call, such as internal system pages viewed by the agent during the call, links clicked by the agent, data entered by the agent, and so on. Although FIG. 4 illustrates two types of data stored in the internal call database 412, various implementations may include other suitable types of data (which may be associated with members and agents of customer service calls).

As shown in FIG. 4, the system 400 includes a database controller 408 that interfaces with the transcription database 402 and the internal call database 412. The database controller 408 includes a join validation module 424, a preprocessing and vectorization module 426, a topic machine learning model module 428, and a sub-topic module 430. The join validation module 424 may join data from the transcription database 402 and the internal call database 412, and validate that the data was joined correctly. For example, transcribed calls from the transcription database 402 may be combined with member and agent data from the internal call database 412, where the join validation module 424 confirms that calls were matched correctly. The join validation module 424 may check that a specific transcribed call from the transcription database 402 is properly joined with the same call from the internal call database 412, in case time stamps or other call identifiers do not result in exact matching.

The preprocessing and vectorization module 426 may process the call transcription data 414 to prepare the data for input to a machine learning model. For example, the preprocessing and vectorization module 426 may remove certain words from the call transcription data 414, apply standard formatting to the transcribed data, convert words or phrases to input vectors for the machine learning model, and so on.

The topic machine learning model module 428 may use one or more machine learning models to process an input vector of the call transcription data 414, to generate one or more topics for a call. For example, the machine learning model may be trained to categorize the call into one or more of multiple classification topics indicating different matters discussed in the call. The categorization may be based on keywords or other features in the transcribed text of the calls. The sub-topic model module 430 may be used to further categorize calls within a topic. For example, once a call has been classified into a parent topic, one or more sub-topic machine learning models or other algorithms may be used to further classify the call into one or more sub-topics of the parent topic.

A user device 106 may be used to allow a system administrator or other user to access data from the database controller 408, such as a listing of topic classifications for a number of calls, via one or more networks 404. For example, an administrator may operate a user interface of the user device 406 to analyze how many calls are being classified into each topic, to determine how to improve a member customer service experience, to determine self-help features for adding to a member web portal, and so on.

The user device 406 may include any suitable user device for displaying text and receiving input from a user, including a desktop computer, a laptop computer, a tablet, a smartphone, etc. Examples of the networks 404 may include a wireless network, a local area network (LAN), the Internet, a cellular network, etc. As shown in FIG. 4, an agent call interface 410 may allow agent call information to be provided to the database controller 408 via the networks 404, may allow an agent to access data from the database controller 408, and so on.

The system 400 may use artificial intelligence insights to improve member engagement by monitoring trending keywords for anomaly detection in customer service calls to identify emerging issues. The system 400 may provide insights into call sentiment based directly on what the members and agents say during the call, and provide increased specificity in classifying topics and sub-topics of the member's reasons for the call. Master agent and member call data may be easily joined with transcript data for millions of calls to create new analytic data sets, with automated cleansing of messy transcript data elements like incorrectly transcribed words, audio during hold portions, and so on.

The system 400 may perform natural language processing at scale, such as processing over 500,000 calls with a model in a few hours. This may allow for identifying repeat call issues, identifying lines of business that receive frequent calls, and so on. In various implementations, a history of a member's prior calls and reason for calls may be provided to an agent to help the agent provide better assistance to the member. The outputs of the modeling may be used to improve member experiences, reduce the number of members that experience common issues, reduce the number of unintended customer service calls, prioritize member outreach, and so on.

Figure 5A:
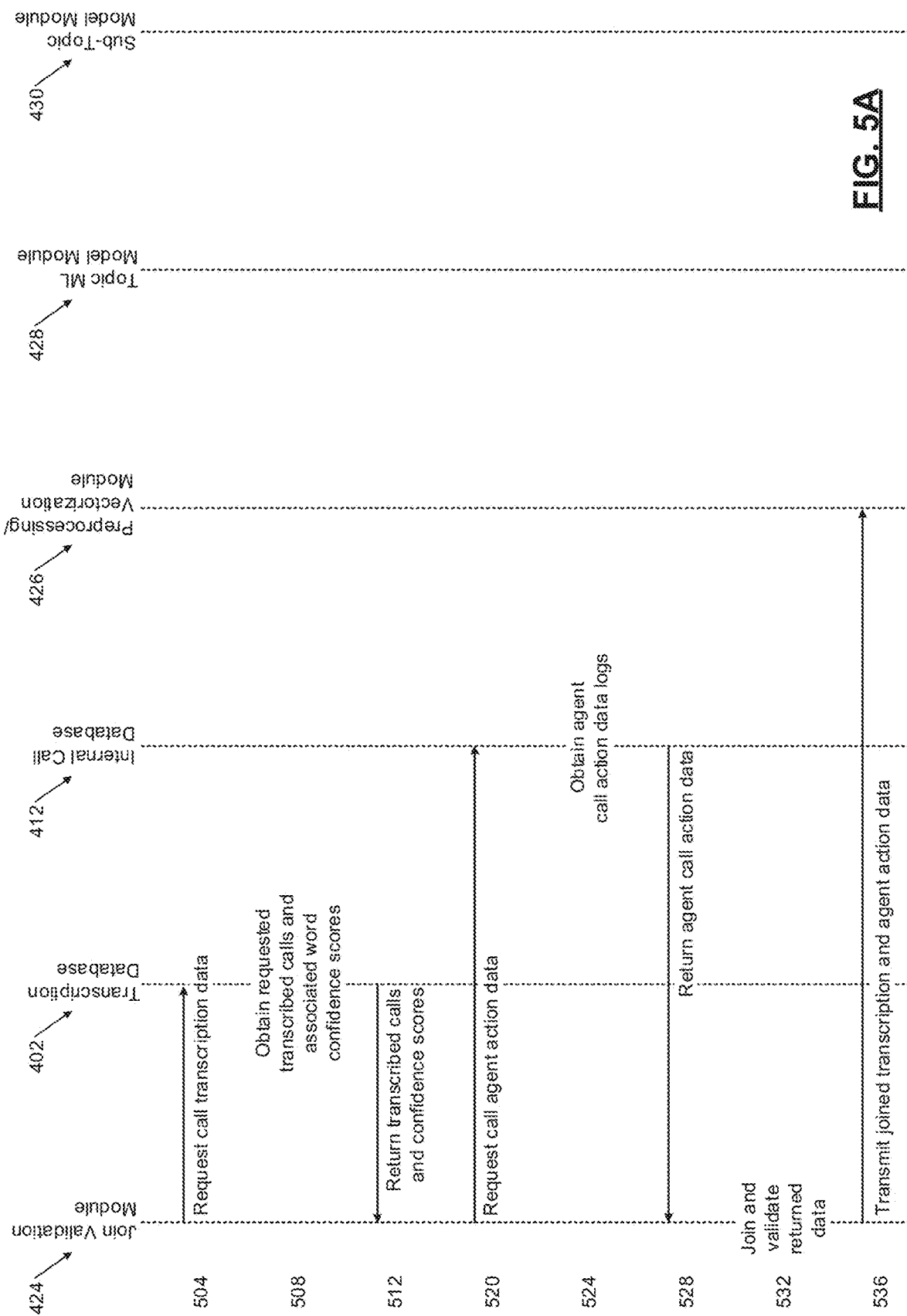
FIGS. 5A and 5B are message sequence charts illustrating example interactions between components of the system of FIG. 4.
Figure 5B:
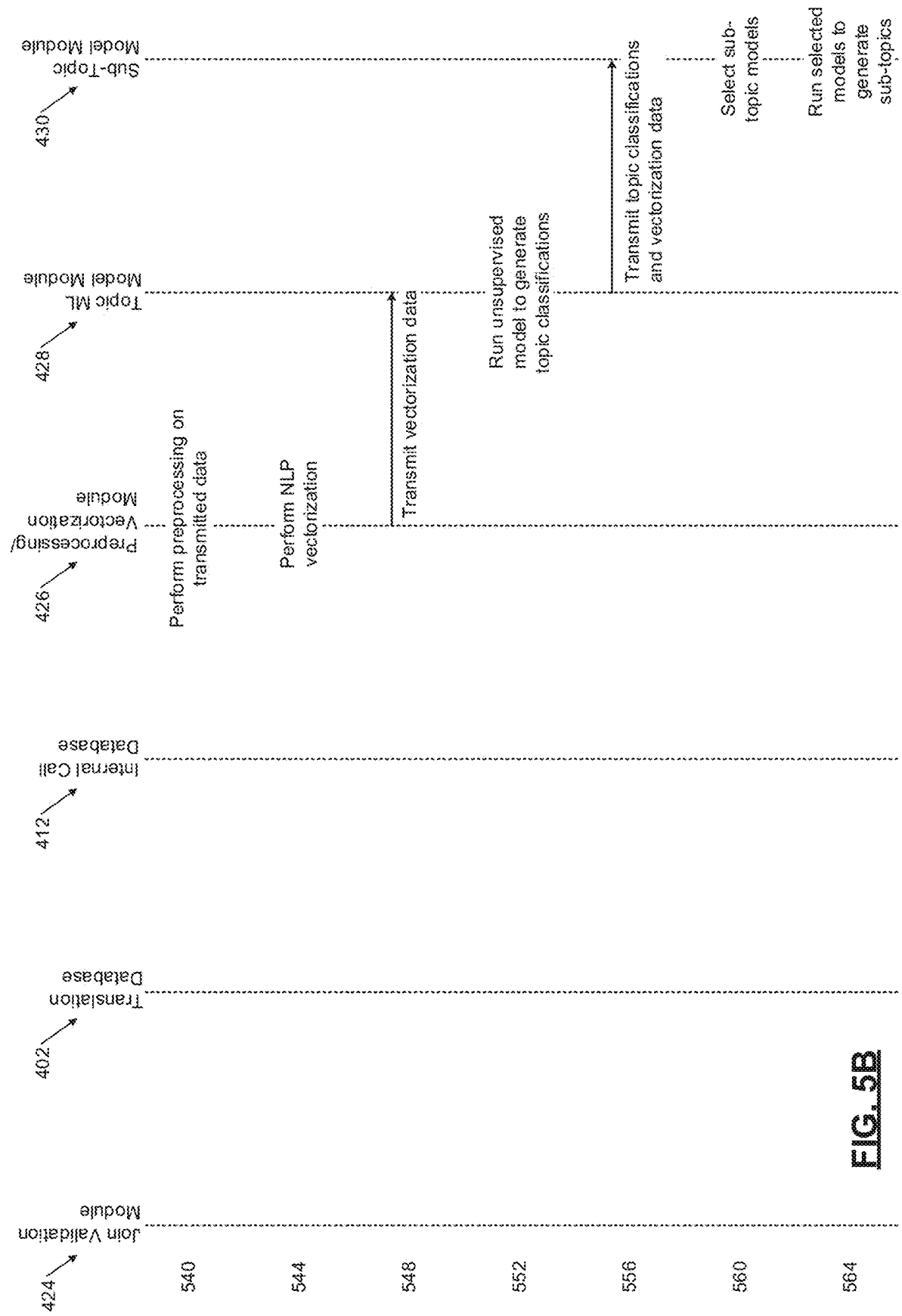

FIGS. 5A and 5B are message sequence charts illustrating example interactions between components of the system 400 of FIG. 4. At line 504 of FIG. 5A, the join validation module 424 requests call transcription data from the transcription database 402. For example, the join validation module 424 may request transcriptions of multiple customer service calls between members and agents during a specified time period (such as within the past month).

At line 508, the transcription database 402 obtains the requested transcribed calls and associated word confidence scores. For example, one or more applications may use an automated speech to text algorithm to convert voice data in calls to transcribed text data. Word confidence scores may be generated to indicate a predicted accuracy of the transcription based on, for example, similarity of the audio waveform for a word to a target match for the word in a speech to text conversion database. In various implementations, the transcription database 402 may obtain and store the transcribed call data and word confidence from a third-party application or service.

The transcription database 402 returns the transcribed calls and confidence scores to the join validation module 424, at line 512. For example, the transcription database 402 may transmit at least a portion of the call transcription data 414 and the word confidence score data 416, which corresponds to calls within a date range requested by the join validation module at 504.

At line 520, the join validation module 424 requests call agent action data from the internal call database 412. The internal call database 412 obtains the agent call action data logs at 524, and returns the agent call action data to the join validation module 424, at line 528. For example, the internal call database 412 may store agent action logging data 422 that is obtained based on actions performed by call agents during a customer service call, such as pages viewed by the agent and links clicked on by the agent during the call. The internal call database 412 may transmit at least a portion of the agent action logging data 422 to the join validation module 424, corresponding to the calls within a date range requested by the join validation module at 520.

At line 532, the join validation module 424 joins and validates the returned data. For example, the join validation module 424 may combine obtained call transcription data 414 and word confidence score data 416 from the transcription database 402, with the agent action logging data 422 and/or the member identifier data 420 obtained from the internal call database. The data may be combined by matching timestamps or other identifiers for calls in each database, or other suitable matching techniques. An example of joining data for calls from the transcription database 402 and the internal call database 412 is described further below with reference to FIG. 6.

The join validation module 424 may verify that the data for two supposedly identical calls has been joined correctly using any suitable technique, such as matching member information and/or agent information within the text of the call transcription data 414 from the transcription database 402, with the member identifier data 420 or agent action logging data 422 from the internal call database 412. An example validating joined data for a call from the two databases is described further below with reference to FIG. 6. At line 536, the join validation module 424 transmits the joined transcription and agent action data to the preprocessing and vectorization module 426.

As shown in FIG. 5B, the preprocessing and vectorization module 426 performs preprocessing on the transmitted data, at line 540. For example, the preprocessing and vectorization module 426 may remove specified words from the call transcription data 414, may apply standardized formatting to the transcription text, and so on. At line 544, the preprocessing and vectorization module 426 performs natural language processing (NLP) vectorization on the preprocessed data.

The NLP vectorization may prepare the transcribed call data for input to one or more machine learning modules to classify at least one topic of the call. An example of preprocessing and performing vectorization on the data is described further below with reference to FIG. 7. At line 548, the preprocessing and vectorization module 426 transmits the vectorization data to the topic machine learning model module 428.

At line 552, the topic machine learning model module 428 runs an unsupervised model to generate topic classifications. Topic classifications may be used to categorize content of the call into one or more topics, which are indicative of different issues that a member is calling customer service about. An example process for generating topic classifications is described further below with reference to FIG. 8.

The topic machine learning model module 428 transmits the topic classifications and vectorization data to the sub-topic model module 430, at line 556. The topic model module 430 selects one or more sub-topic models at line 560, and runs the selected model(s) to generate sub-topics at line 564. For example, the sub-topic model module 430 may be used to further classify each call in a parent topic into one or more sub-topics of that parent topic. An example process for classifying calls into sub-topics is discussed further below with reference to FIG. 9.

Transcription Data Validation and Preprocessing

Figure 6:
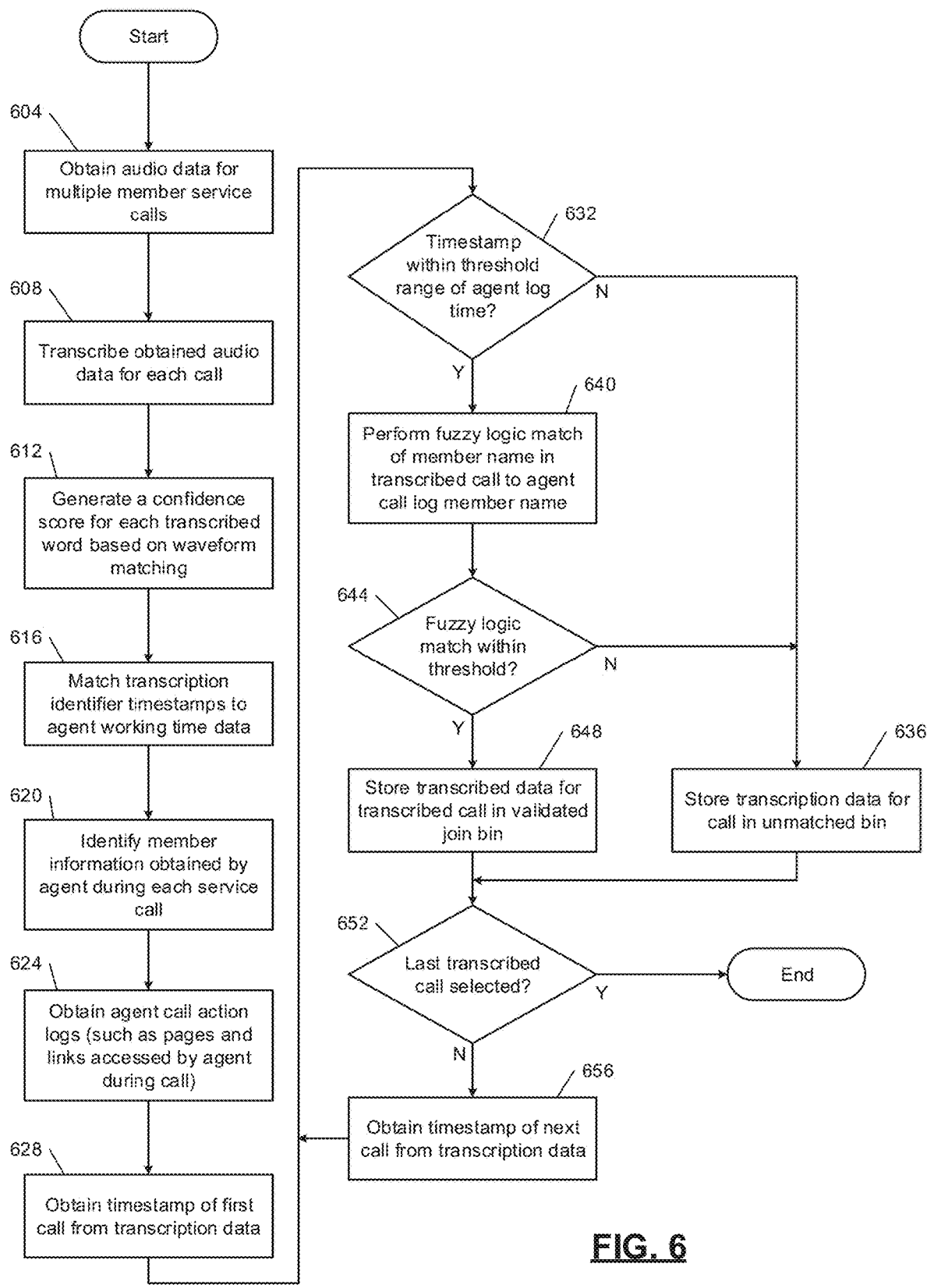
FIG. 6 is a flowchart depicting an example process for joining structured transcription data from multiple database entries.

FIG. 6 is a flowchart depicting an example process for joining structured transcription data from multiple database entries. Control begins at 604 by obtaining audio data for multiple member service calls. Control then transcribes the obtained audio data for each call at 608. For example, an automated speech to text application may be used to convert audio data for each call into transcribed text. In various implementations, audio data may be provided to a third party for transcription. In various implementations, the transcription may be performed separately from the control of FIG. 6 such that when transcribed text is required, in FIG. 6, that transcribed text is ready. For example, a third party may transcribe each call soon after the call ends.

At 612, control generates a confidence score for each transcribed word based on waveform matching. For example, the confidence score may indicate a predicted accuracy of the transcription of the word based on, for example, the degree of matching between the audio waveform for the word and a target audio waveform for a corresponding entry in a speech to text database.

Control matches transcription identifier timestamps with agent working time data at 616. For example, control may obtain a timestamp for each call in the call transcription data 414 of the transcription database 402, records of working hours for each agent, and timestamps for each call in the agent action logging data 422 from the internal call database 412. Control may then join the data by using the timestamps to match similarly timed calls from the transcription database 402 and the internal call database 412.

At 620, control identifies member information obtained by the agent during each service call. For example, control may obtain member identifier data 420 stored in the internal call database 412 for each call. The member identifier data may include, for example, the name of the member, a membership number obtained by the agent during the call, or other suitable identification information.

Control obtains agent call action logs at 624. For example, control may obtain the agent action logging data 422 that indicates pages and links in an internal customer service system that were accessed by the agent during the call. These pages and links may help indicate a type of issue the member was calling customer service about, to facilitate classification of the call into one or more topics.

At 628, control obtains a timestamp of the first call from the transcription data, such as the call transcription data 414. Control then determines whether the timestamp is within a threshold range of an agent log time at 632. For example, if the call from the transcription database 402 the timestamp is within five seconds, within ten seconds, or any other suitable threshold indicating the call entries in each database may have approximately the same start time, control may determine that the two entries having similar starting timestamps include data recorded from the same call.

If the timestamps of the call entries are different from one another by an amount of time that is greater than the threshold, such as more than two minutes apart, more than ten minutes apart, and so on, control may determine that the two call entries are actually different calls that occurred, or that the timestamp discrepancies are too great to confidently identify the call entries as coming from the same call. The threshold range may be selected to include any suitable time or value or time range that indicates a likelihood of a call entry from the transcription database 402 being recorded from the same call as a call entry from the from the internal call database 412. For example, system clocks may be slightly different for call data that is recorded by the transcription application compared to call data that is recorded to the internal call database 412.

In view of the above, if control determines at 632 that the timestamp of a transcribed call entry from the transcription database 402 is not within a threshold range of an agent log time, control proceeds to 636 to store the transcription data for the call in an unmatched call bin. The unmatched call bin is used to store transcription data for calls that were unable to be matched within an acceptable degree of accuracy with a corresponding call from the internal call database 412.

If control determines at 632 that the timestamp of the transcribed call entry is within a threshold range of a call from the internal call database 412, control proceeds to 640 to perform fuzzy logic matching of the member name (sometimes referred to as an entity name) of the transcribed call entry to the member name from the agent action logging data 422 of the internal call database 412. For example, the join validation module 424 may attempt to confirm a successful join of call entries from the transcription database 402 and internal call database 412 by using a fuzzy logic match of the member name in the transcribed call data to the member name associated with the call entry from internal call database 412.

If a match is present, this may be indicative that two call entries are actually from the same call and have been successfully joined. If the fuzzy logic matching indicates that the member name from the transcribed call data is not present in the call data from the internal call database 412, this may indicate that the call entries should not be joined because they are directed to different customer service calls. Any suitable fuzzy logic algorithm (or other algorithm) may be used for joined call validation. For example, the fuzzy logic matching may use an algorithm to identify two elements of text entries that are approximately similar, but not exactly the same, such as a Levenshtein distance between string sequences, a Soundex phonetic algorithm that searches for similar sounding names, a Metaphone or double Metaphone algorithm, and so on.

In view of the above, if control determines at 644 that the fuzzy logic match is not within a threshold, such as a 90% match threshold, an 80% match threshold, and so on, control proceeds to 636 to store the transcription data for the call in the unmatched bin. For example, the match threshold may be a fuzzy logic matching score or value that indicates a likelihood that a transcribed member name and member identifier information refer to the same member. If control determines at 644 that the fuzzy logic match of the member name in the data from the transcription database 402 and a member name associated with the call entry from the internal call database 412 is within the specified threshold, control proceeds to 648 to store the data for the transcribed call in a validated join bin. The validated join bin may store calls for which data that has been joined between the transcription database 402 and the internal call database 412 has an acceptable degree of confidence that each call entry was recorded from the same customer service call.

The validated joined calls may be stored as joined call data entries in the transcription database 402, the internal call database 412, or another database. In various implementations, the joined call data entries may be stored as new database entries, or may be stored via a link such as a pointer between joined entries from the transcription database 402 and the internal call database 412 or a reference table associating the entries from the transcription database 402 and the internal call database 412.

At 652, control determines whether the last transcribed call entry has been selected. If not, control proceeds to 656 to obtain a timestamp of the next call entry from the call transcription data 414, and returns to 632 to determine whether the timestamp of the next call entry is within a threshold range of a timestamp from another call entry of the internal call database 412. If the last transcribed call entry has been processed at 652, the process of FIG. 6 ends.

Figure 7:
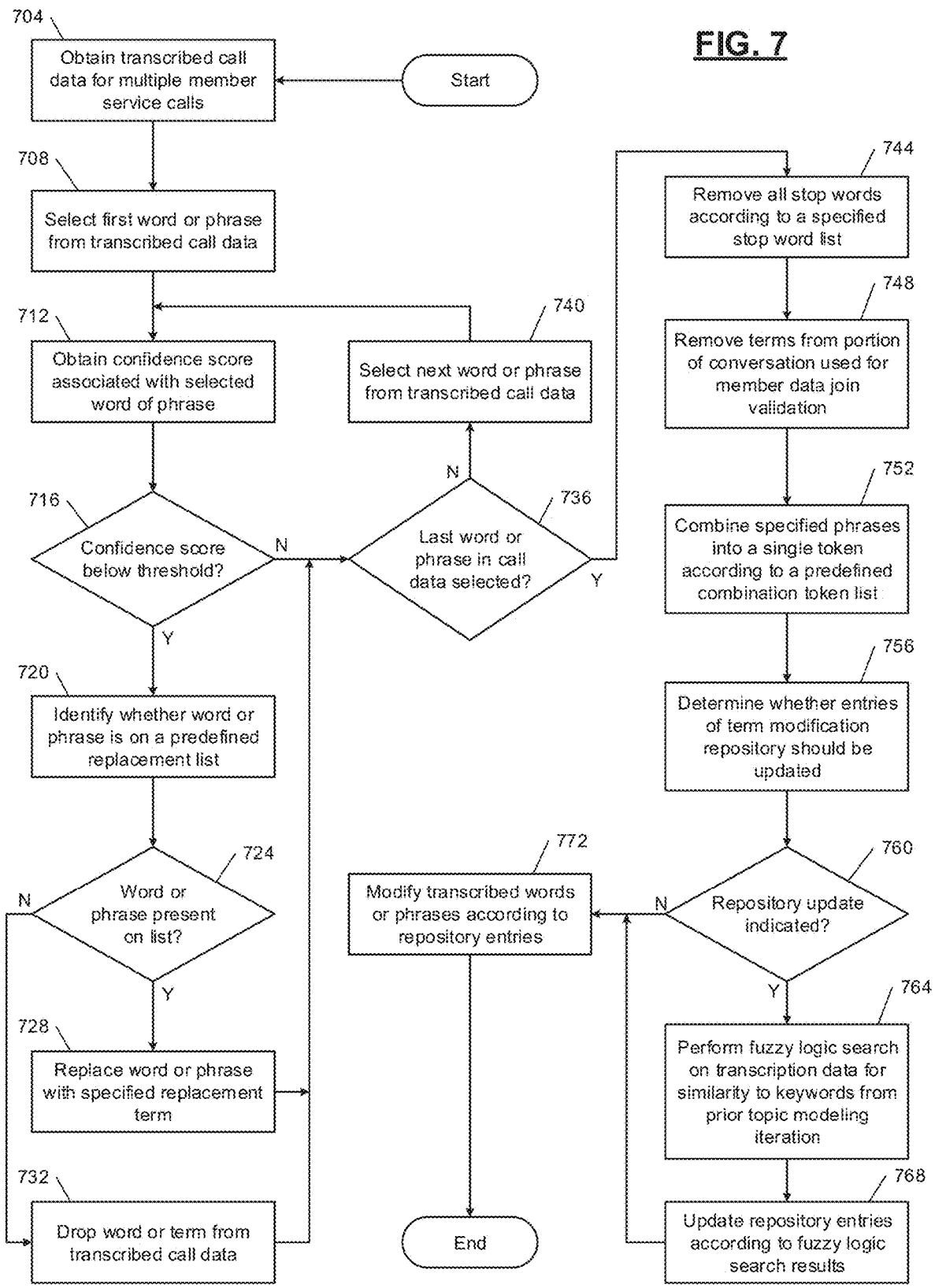
FIG. 7 is a flowchart depicting an example process for preprocessing structured transcription database entries for use in a machine learning model.

FIG. 7 is a flowchart depicting an example process for preprocessing structured transcription database entries for use in a machine learning model. Control begins at 704 by obtaining transcribed call data for multiple member customer service calls. Control then selects the first word or phrase from the transcribed call data at 708.

At 712, control obtains a conference score associated with the selected word or phrase. For example, control may obtain a conference score from the word confidence score data 416 of the transcription database 402. Control then compares the conference score to a conference score threshold, such as a 90% likelihood of an accurate transcription, an 80% likelihood of an accurate transcription, and so on.

If control determines at 716 that the confidence score is below the threshold, control proceeds to 720 to identify whether the word or phrase is included in a predefined replacement list. For example, the predefined replacement list may store words that are commonly transcribed incorrectly, and may suggest replacement terms that are often the correct word or phrase that was likely spoken by the member or agent.

If the words or phrase is present on the predefined replacement list at 724, control proceeds to 728 to replace the word or phrase with the specified replacement term. For example, if a transcribed word has a conference score below the threshold, and the transcribed word is on a list of words that are commonly transcribed incorrectly during customer service calls, control may replace the word in the transcribed text with a specified replacement term that corresponds to the likely incorrect transcribed word. If control determines at 724 that a low confidence score word or phrase is not present on the predefined replacement list, control may drop the word or term from the transcribed call data at 732.

After replacing or dropping a low confidence score word at 728 or 732, or determining that the transcribed word has an acceptable confidence score at 716, control proceeds to 736 to determine whether the last word or phrase in the transcribed call data has been processed. If not, control selects the next word or phrase from the transcribed call data at 740, and returns to 712 to obtain a conference score associated with the selected next word or phrase.

If control determines at 736 that the last word or phrase in the transcribed call data has been processed, control proceeds to 744 to remove all stop words from the transcribed call data according to a specified stop word list. For example, the specified stop word list may include words that are of low importance for topic classification, because they have a very low or zero impact on output classification of a machine learning model. Control then removes the identified stop words from the transcribed call text.

At 748, control removes terms from the portion of the conversation that were used previously to validate a join of call entries from the call transcription database 402 and the internal call database 412. For example, the member name within the transcribed call text that was used for comparison to member identifier data 420 from internal call database 412 in order to validate the join of two call entries, may be removed from the transcribed call text during preprocessing. In this example, the member's name may not be particularly useful in identifying a reason for the customer service call for topic classification, so the member name is removed prior to providing input to the machine learning model.

At 752, control combines specified phrases into a single token according to a specified combination token list. For example, some phrases or terms may include multiple words that are commonly used together, such that a single token can be generated to represent the full phrase or term. Representing a phrase or term as a single token may allow for more accurate classification by a machine learning model.

Control proceeds to 756 to determine whether entries of a term modification repository should be updated. For example, the term modification repository may be continually maintained and updated to store terms or phrases that are commonly included in transcribed call text, store terms or phrases that are commonly transcribed incorrectly, and so on. Control determines at 760 whether an update to the repository is indicated, such as identification of a phrase or term having a call occurrence count that reaches a threshold (such as at least ten calls having the same phrase or term, at least one hundred calls having the same phrase or term, and so on). In various implementations, control may identify a phrase or term that is incorrectly transcribed a specified number of times, such as a same phrase transcription error occurring in at least ten calls, in at least one hundred calls, and so on. If a repository update is indicated at 760, control proceeds to 764 to perform a fuzzy logic search on the transcription data for similarity to keywords from a prior topic modeling iteration.

For example, transcribed call data may be provided to the machine learning model to generate topic keywords associated with a first set of topic classifications, with keywords stored in a repository for indicating important transcribed words and phrases. In various implementations, the transcribed call data may be preprocessed again based on the keywords generated from the first modeling iteration and stored in the repository, in order to further enhance the processing of the transcription call data based on results of the prior modeling iteration. For example, it may be difficult to correct every incorrectly transcribed word in the whole call entry, so the system may focus on correcting improper transcriptions of keywords only.

At 768, control updates repository entries according to the fuzzy logic search results. For example, the repository entries may be updated based on fuzzy logic matches between the transcription call data and keywords from the prior topic modeling generation (such as adding additional common phrases or terms from the transcribed call data that are similar to generated keywords, or identifying additional likely transcription errors for words in the transcribed call data that are similar to the generated keywords). Control then proceeds to 772 to modify words or phrases in the transcribed call data according to the repository entries. For example, a word or phrase in the transcribed call data that matches a repository entry may be replaced with a corresponding word or phrase stored in association with the repository entry (such as a correct replacement term for a likely incorrect transcription).

Automated Topic Classification

Figure 8:
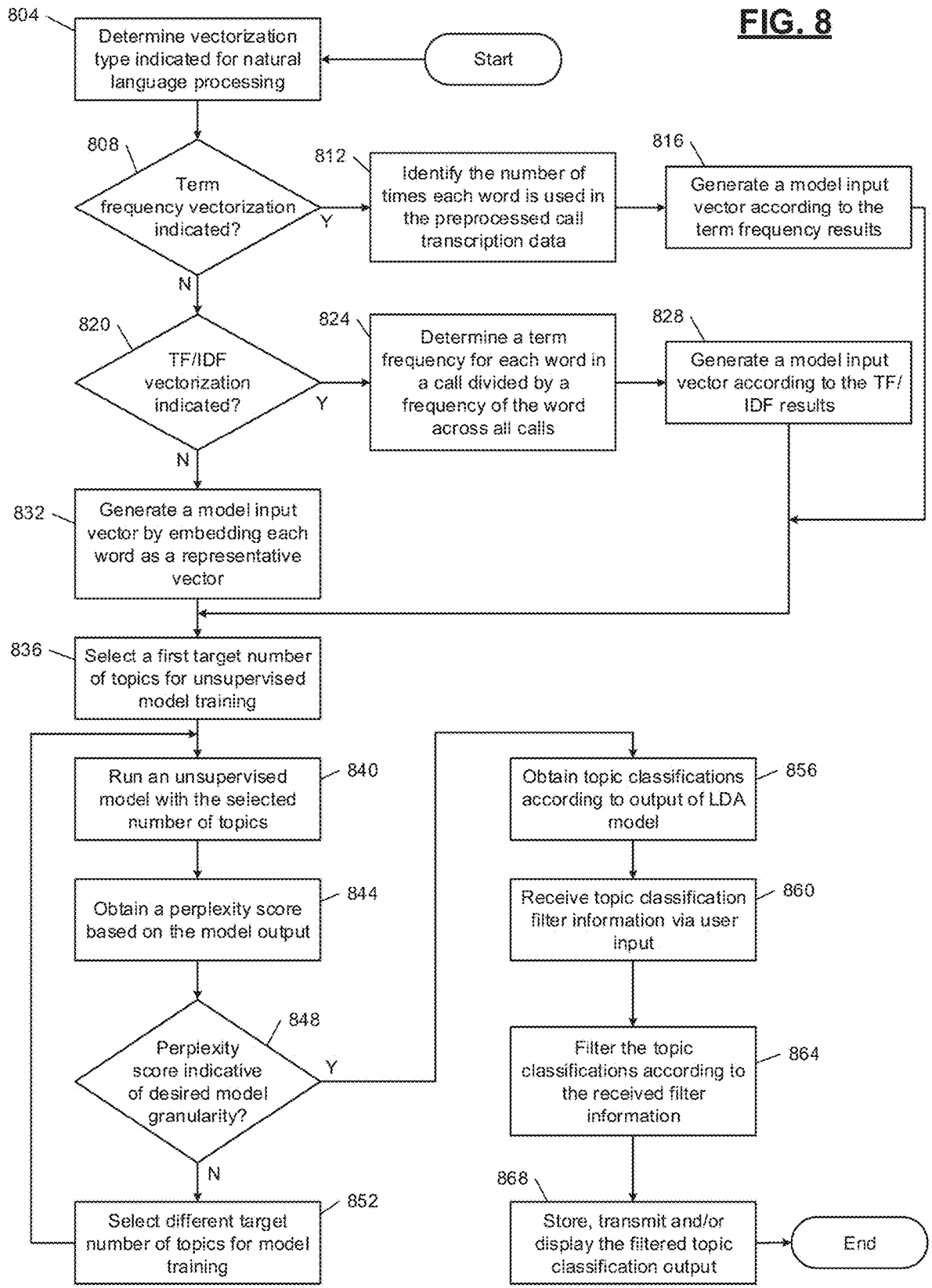
FIG. 8 is a flowchart depicting an example process for generating topic classifications using a machine learning model.

FIG. 8 is a flowchart depicting an example process for generating topic classifications using a machine learning model. At 804, control determines a vectorization type that has been indicated for natural language processing (NLP) vectorization. In various implementations, the NLP vectorization may include term frequency vectorization, term frequency inverse document frequency (TF/IDF) vectorization, or embedded vectorization, which may be specified by a system administrator or application setting.

If control determines at 808 that term frequency vectorization has been indicated, control proceeds to 812 to identify the number of times each word is used in the preprocessed call prescription data. Control then generates a model input vector according to the term frequency results at 816. Any suitable term frequency technique may be used to generate the model input vector.

If control determines at 820 that term frequency vectorization has not been specified, control proceeds to 820 to determine whether TF/IDF vectorization has been indicated. If control determines at 820 that TF/IDF vectorization is specified, control proceeds to 824 to determine a frequency for each word in a transcribed call entry, divided by a frequency of the word across all transcribed call entries in a set. Control then generates a model input vector at 828 according to the TF/IDF results. Any suitable TF/IDF technique may be used to generate the model input vector.

If control determines at 820 that TF/IDF vectorization has not been indicated, control proceeds to 832 to generate a model input vector by embedding each word as a representative vector. Any suitable word embedding technique may be used to generate the input vector for the machine learning model. After generating the model input vector according to term frequency, TF/IDF or embedding, control proceeds 836 to select a first target number of topics for unsupervised model training.

At 840, control runs an unsupervised model with the selected target number of topics. Control then obtains a perplexity score based on the model output at 844. At 848, control determines whether the perplexity score is indicative of a desired model granularity.

For example, control may use an elbow method to determine whether a target number of topic classifications has a desired level of granularity. In various implementations, control may initially run the unsupervised model with three topics, four topic, five topics, or any other suitable number, and then can determine whether perplexity score indicates that little granularity. If control determines at 848 that the perplexity score is not indicative of a desired model granularity, control proceeds to 852 to select a different target number of topics for model training, such as one more or one less than the number of topics of the previous model training, and returns to 840 to run the unsupervised model with the updated number of selected topics.

In various implementations, the unsupervised model may be run multiple times with a different number of topics for each run, to determine a number of clusters that explain variation in the transcribed call entry data set to a desired degree. For example, a Latent Dirichlet Allocation (LDA) model may be run with various numbers of clusters, with perplexity score outputs of the model recorded for each cluster number. The perplexity score for each number of clusters may then be plotted to determine an "elbow" where the change in perplexity score becomes less significant as the number of clusters is increased.

If the perplexity score output of the model decreases by 10% for three clusters compared to two clusters, and another 10% for four clusters compared to three clusters, but only decreases 2% for five clusters compared to four clusters, control may determine that four clusters is the desired granularity for the model (because increasing from four clusters/topics to five does not have much effect on the perplexity score of the model, indicating that there are likely four general clusters/topics in the transcribed call data). The perplexity score may be a statistical measure representing how well the LDA model with the selected number of clusters predicts the sample transcribed call data entries, where a lower perplexity score indicates the model is better at predicting the sample.

The LDA model may perform topic modeling using an unsupervised algorithm to spot semantic relationships between words in a group with the help of associated indicators. The model may determine a number of words in a document, choose a topic mixture for the document over a fixed set of topics, select a topic based on a document's multinomial distribution, and pick a word based on the topic's multinomial distribution. In various implementations, the LDA model may randomly assign each word in each document to one of the topics, and assume that all topic assignments except for the current one are correct.

If a proportion of words in document 'd' that are currently assigned to a topic 't' is equal to p(topic t|document d), and a proportion of assignments to topic 't' over all documents that belong to word 'w' is equal to p(word w|topic t), the two proportions may be multiplied and assigned a new topic based on that probability. In various implementations, any other suitable LDA or other topic modeling algorithms may be used. The LDA model may be trained by supplying historical input vectors to identify a target number of clusters or topics corresponding to a target granularity (such as a desired number of topics that sorts customer service calls into different categories that are distinct and useful for analyzing).

If control determines at 848 that the perplexity score indicates the target number of topics produces a desired level of model granularity, control proceeds to 856 to obtain topic classifications according to an output of the LDA model. In various implementations, the topic classifications may include keywords associated with an output of the LDA model, or other parameters used to classify transcribed call data entries into different topics in the LDA model.

Control then receives topic classification filter information via user input, at 860. For example, a system administrator may review the topic classification outputs from the LDA model, and make revisions or tweaks based on the administrator's knowledge of common customer service topic call topic categories.

At 864, control filters the topic classifications according to the received filter information. Control then stores, transmits and/or displays the filtered topic classification output at 868. For example, after the system administrator provides input to revise the topic classifications output by the model, control may revise the model output classifications by adding, removing or replacing keywords associated with each topic classification according to the input from the administrator. Control then stores the revised model output classifications as the finalized model for classifying other transcribed call entries.

FIG. 9 is a flowchart depicting an example process for generating sub-topic classifications within the parent topic classifications generated by, for example, the topic modeling process of FIG. 8. Control begins at 904 by receiving a list of topic classifications from the base model output (such as the output of the LDA model which may be revised according to system administrator input at 864 in FIG. 8).

Control then selects a first topic classification and obtains transcribed call entries that were classified within the selected topic classification, at 908. For example, control may select a first parent topic classification, and obtain only the transcribed call entries that were assigned to that particular parent topic classification according to an output of an LDA model.

Control then proceeds to 912 to identify a sub-topic model to be used for the selected topic classification. For example, multiple approaches may be used to classify sub-topics within a parent topic, such as running LDA models or matching a term repository. A type of sub-topic classification may be specified by a system administrator, by an application setting, and so on.

At 916, control determines whether an additional LDA model has been identified for sub-topic classification. If so, control proceeds to 920 to remove terms from the transcribed call data entry that were used for base model topic classification. For example, some keywords within the transcribed call data entry are used to assign a call to the parent topic, and those keywords may be removed from the transcribed call data prior to sub-topic generation, so other words in the transcribed call data of higher importance may be used to classify the sub-topic of the call (because some words in the call may be more specific to sub-topics than to the more general parent topic).

Control then proceeds to 924 to select call data portions that were spoken by the agent. In various implementations, once a call has been categorized into a parent topic, words spoken by agents may be more indicative of a particular sub-topic classification within the parent topic. For example, once a member identifies a general reason for the call, the agent may be better informed to direct the call to a specific sub-issue within the general area of the member's concern.

At 928, control runs an unsupervised LDA some model on the agent data portions of the transcribed call entry, to generate the sub-topic classifications. Control then proceeds to 932 to store, transmit and/or display the sub-topic classification outputs from the model. Referring back to 916, if control determines that an additional LDA model has not been identified for sub-topic classification, control proceeds to 936 to determine whether term repository matching has been specified for sub-topic classification.

If control determines at 936 that term repository matching has been specified, control proceeds to 940 to obtain words and phrases from the term repository that are specific to different sub-topic classifications. For example, each sub-topic may have its own term repository that contains terms which are highly correlated with calls that belong to the sub-topic. At 944, control classifies each transcribed call entry into one or more of the sub-topics, according to matching between terms of transcribed call entry and terms from the sub-topic term repositories. For example, if a sub-topic commonly includes a specified phrase in most calls that are assigned to the sub-topic (as indicated by the term repository), and a transcribed call entry includes the specified phrase, the call entry may be assigned to the sub-topic classification based on the match with the phrase in the term repository. Control then proceeds 932 to store, transmit and/or display the sub-topic classification output for the selected sub-topic.

Returning to 936, if control determines that term repository matching has not been specified for sub-topic classification, control proceeds to 948 to build a supervised model using keywords generated within the parent topic. For example, other sub-topic model keywords or parent topic keywords may be used to build a supervised model for classifying sub-topics within the parent topic. Control then runs the supervised model at 952 to generate sub-topic classifications for the transcribed call entries. At 932, control stores, transmits and/or displays the sub-topic classification outputs of the model.

At 956, control determines whether last parent topic classification has been selected. If not, control proceeds to 960 to select the next topic classification from the base model output, and returns to 912 to identify a sub-topic model to be used for the selected parent topic classification. If control determines at 956 that the last parent topic classification has been selected, the process of FIG. 9 ends.

In various implementations, sub-topic modeling may include obtaining each transcribed call entry that has been classified to a first one of the parent topics, and then using the elbow method to identify an optimal number of sub-topics (such as by using a logarithmic function based on perplexity scores for different numbers of sub-topic classifications). An LDA model then provides an output to create a list of sub-topics.

Custom labels may be created for each sub-topic using keywords. For example, an 'Approval Needed' sub-topic may include calls having keyword phrases such as DOCTOR'S APPROVAL, NEED TO HAVE APPROVAL, APPROVAL OF DOCTOR, WE HAD TO HAVE APPROVAL, NEED APPROVAL, APPROVAL REQUIRED, NEED TO APPROVE, REQUIRE APPROVAL, and WE'RE STILL WAITING FOR THE APPROVAL. A 'Member Follow-up' sub-topic may include calls having keyword phrases such as ALREADY SENT A FAX, NEED THE NEW PRESCRIPTION, NEED NEW PRESCRIPTION, WE DID JUST SEND ONE OUT, DOCTOR IS NOT RESPONDING, WE HAVE NOT RECEIVED IT, DOCTOR'S OFFICE HAS NOT SENT INTO US, DO NOT ALLOW US TO SEND FOR A CONTROLLED SUBSTANCE TO THE DOCTOR'S OFFICE, CAN'T SEND THE FAX, DOCTOR HAS TO BE IN OUR SYSTEM, IN ORDER FOR US TO SEND THEM SOMETHING, IN ORDER FOR US TO SEND SOMETHING, DOCTORS ARE NOT RESPOND, THE DOCTOR TO NOT RESPOND TO THE REQUESTS, CAN'T PROCESS ANYTHING UNTIL WE GET THE PRESCRIPTIONS, DOCTOR TO RESUBMIT, NEEDS TO RESPOND TO THE FAX, DOCTOR JUST SIMPLY NEEDS TO RESPOND TO THE FAX, DOCTOR NEEDS TO RESPOND TO THE FAX, TRIED CONTACTING THE DOCTOR, DOCTOR NEVER RESPONDED, UNABLE TO CONTACT THE DOCTOR, CONTACT THE DOCTOR.

A 'New Physician' sub-topic may include calls having keyword phrases such as NEW DOCTOR, SEE AN UPGRADE, DIFFERENT DOCTOR, GET THE DOCTOR. A 'New Rx Needed' sub-topic may include calls having keyword phrases such as NEED A PRESCRIPTION FROM YOUR ACTIVE DOCTOR, NEED A PRESCRIPTION FROM YOUR DOCTOR, NEED A PRESCRIPTION, REQUEST THROUGH TO THEM, REQUEST THEM, NEEDING A NEW PRESCRIPTION, NEW PRESCRIPTION, SEND A REQUEST, SEND PRESCRIPTION, REACH OVER TO THE DOCTOR'S OFFICE, REACH OVER TO THE DOCTOR, RESUBMIT THE REQUEST, RESUBMIT THE REQUEST, GET FROM YOUR NEW DOCTOR. A 'Renewal' sub-topic may include any call entries having keyword phrases that include RENEWAL.

Once the sub-topic classifications are generated, each call may be classified into one or more sub-topics. As an example, an entry having a Call-ID 101 may be classified into 'Approval Needed' and 'New Physician' sub-topics, while another entry having a Call-ID of 103 is classified into the 'Member Follow-up' sub-topic, a third entry having a Call-ID of 105 is classified into an 'Others' category that does not meet any of the specified sub-topic classifications, and a fourth entry having a Call-ID of 107 is classified into a 'Renewal' sub-topic.

Control may then drop out the 'Others' unclassified entries (such as Call-ID 105) and call entries having multiple sub-topic classifications (such as Call-ID 101), to leave only call entries having a single sub-topic classification. These entries may be used to train a supervised machine learning model to classify the call entries in the 'Others' set. In various implementations, the single sub-topic classification entries may be preprocessed prior to training the supervised classification, such as by dropping out keywords that were used to classify entries into the parent topic, and removing keywords that were used to generate the sub-topic classifications.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computer system comprising:
   memory hardware configured to store a transcription database, a call database and computer-executable instructions, wherein the transcription database includes multiple call transcription data entries and multiple word confidence score data entries associated with each call transcription data entry, and wherein the call database includes multiple agent call log data entries; and
   processor hardware configured to execute the instructions, wherein the instructions include:
   joining at least a portion of the call transcription data entries with at least a portion of the agent call log data entries according to timestamps associated with the entries to generate a set of joined call data entries, wherein each of the set of joined call data entries includes one of the call transcription data entries paired with a corresponding one of the agent call log data entries;
   for each of the set of joined call data entries:
     obtaining a transcribed entity name from the call transcription data entry;
     validating the joined call data entry by determining whether the transcribed entity name matches with entity identifier information associated with the agent call log data entry in satisfaction of a matching threshold indicative of a likelihood that the transcribed entity name and the entity identifier information refer to the same entity; and
     in response to a successful validation of the joined call data entry:
       preprocessing the joined call data entry according to the word confidence score data entries associated with the call transcription data entry to generate preprocessed text, wherein the preprocessing includes removing or replacing at least a portion of transcribed text of the call transcription data entry; and
       performing natural language processing vectorization on the preprocessed text to generate an input vector for an unsupervised machine learning model; and
   for each of at least a portion of the input vectors:
     supplying the input vector to the unsupervised machine learning model to assign an output topic classification of the model to the joined call data entry associated with the input vector;
     supplying the input vector to at least one sub-topic model associated with the output topic classification to assign one or more sub-topic output classifications to the joined call data entry associated with the input vector; and
     modifying a user interface of a user device to display the output topic classification and the one or more sub-topic output classifications.

2. The system of claim 1, wherein performing natural language processing vectorization includes at least one of:
   performing term frequency vectorization on the preprocessed text to generate the input vector;
   performing term frequency inverse document frequency (TF/IDF) vectorization on the preprocessed text to generate the input vector; and
   performing embedded vectorization on the preprocessed text to generate the input vector.

3. The system of claim 1, wherein the unsupervised machine learning model includes a Latent Dirichlet Allocation (LDA) model, and each output topic classification is assigned according to an output of the LDA model.

4. The system of claim 3, wherein the instructions further include training the LDA model by:

running the LDA model on historical input vectors with different numbers of clusters for the LDA model;

obtaining a perplexity score for each run of the LDA model with a different number of clusters;

identifying a number of clusters corresponding to a target granularity according to the perplexity score; and setting a number of output topic classifications of the LDA model according to the identified number of clusters corresponding to the target granularity.

5. The system of claim 1, wherein supplying the input vector to at least one sub-topic model includes at least one of:

supplying the input vector to a sub-topic LDA model to generate the one or more sub-topic output classifications;

generating the one or more sub-topic output classifications according to matching between the input vector and one or more terms in a sub-topic term repository; and supplying the input vector to a sub-topic supervised machine learning model to generate the one or more sub-topic output classifications.

6. The system of claim 5, wherein the instructions include training the sub-topic supervised machine learning model by:

creating a training data set based on other joined call data entries within a same output topic classification that have one assigned sub-topic output classification;

preprocessing the training data set to remove terms used for assigning the output topic classification and assigning the sub-topic output classification to each joined call data entry in the training data set for generation of a preprocessed training data set; and supplying the preprocessed training data set to the sub-topic supervised machine learning model to train the sub-topic supervised machine learning model using supervised learning.

7. The system of claim 1, wherein the instructions further include obtaining each word confidence score data entry by comparing an audio waveform of a word associated with transcribed text of a call transcription data entry to an audio waveform of a target corresponding word in an automated transcription application database.

8. The system of claim 7, wherein the preprocessing includes, in response to a determination that a word confidence score associated with a word in the transcribed text is below a threshold indicative of a likelihood of an accurate transcription:

searching for the word in a term repository of common incorrect transcriptions;

replacing the word in the transcribed text according to the term repository in response to identifying the word in the term repository; and removing the word from the transcribed text in response to failing to identify the word in the term repository.

9. The system of claim 1, wherein each agent call log data entry includes at least one of:

a customer service system page viewed by an agent during a customer service call; and a customer service system link accessed by the agent during the customer service call.

10. The system of claim 1, wherein:

determining whether the transcribed entity name matches with entity identifier information includes performing a fuzzy logic match between the transcribed entity name and an entity name in the entity identifier information associated with the agent call log data entry; and the instructions further include:

in response to a result of the fuzzy logic match being above the matching threshold, storing the joined call data entry in a matched call bin to indicate a successful validation; and in response to the result of the fuzzy logic match being below the matching threshold, storing the joined call data entry in an unmatched bin to indicate an unsuccessful validation.

11. The system of claim 1, wherein preprocessing includes at least one of:

removing a word from transcribed text of the call transcription data entry in response to the word matching a corresponding entry on a stop word removal list;

removing a portion of the transcribed text that was used for validation of the joined call data entry; and combining multiple words of the transcribed text into a single token.

12. The system of claim 1, wherein the instructions further include transmitting the output topic classification and the one or more sub-topic output classifications to another device.

13. A computerized method for automated processing of transcription database entries, the method comprising:

joining at least a portion of multiple call transcription data entries with at least a portion of multiple agent call log data entries according to timestamps associated with the entries to generate a set of joined call data entries, wherein a transcription database stores the multiple call transcription data entries and multiple word confidence score data entries associated with each call transcription data entry, wherein a call database stores the multiple agent call log data entries, and wherein each of the set of joined call data entries includes one of the call transcription data entries paired with a corresponding one of the agent call log data entries;

for each of the set of joined call data entries:

obtaining a transcribed entity name from the call transcription data entry;

validating the joined call data entry by determining whether the transcribed entity name matches with entity identifier information associated with the agent call log data entry in satisfaction of a matching threshold indicative of a likelihood that the transcribed entity name and the entity identifier information refer to the same entity; and in response to a successful validation of the joined call data entry:

preprocessing the joined call data entry according to the word confidence score data entries associated with the call transcription data entry to generate preprocessed text, wherein the preprocessing includes removing or replacing at least a portion of transcribed text of the call transcription data entry; and performing natural language processing vectorization on the preprocessed text to generate an input vector for an unsupervised machine learning model; and for each of at least a portion of the input vectors:

supplying the input vector to the unsupervised machine learning model to assign an output topic classification of the model to the joined call data entry associated with the input vector;

supplying the input vector to at least one sub-topic model associated with the output topic classification to assign one or more sub-topic output classifications to the joined call data entry associated with the input vector; and modifying a user interface of a user device to display the output topic classification and the one or more sub-topic output classifications.

14. The method of claim 13, further comprising transmitting the output topic classification and the one or more sub-topic output classifications to another device.

15. The method of claim 13, wherein performing natural language processing vectorization includes at least one of:

performing term frequency vectorization on the preprocessed text to generate the input vector;

performing term frequency inverse document frequency (TF/IDF) vectorization on the preprocessed text to generate the input vector; and performing embedded vectorization on the preprocessed text to generate the input vector.

16. The method of claim 13, wherein the unsupervised machine learning model includes a Latent Dirichlet Allocation (LDA) model, and each output topic classification is assigned according to an output of the LDA model.

17. The method of claim 16, further comprising training the LDA model by:

running the LDA model on historical input vectors with different numbers of clusters for the LDA model;

obtaining a perplexity score for each run of the LDA model with a different number of clusters;

identifying a number of clusters corresponding to a target granularity according to the perplexity score; and setting a number of output topic classifications of the LDA model according to the identified number of clusters corresponding to the target granularity.

18. The method of claim 13, wherein supplying the input vector to at least one sub-topic model includes at least one of:

supplying the input vector to a sub-topic LDA model to generate the one or more sub-topic output classifications;

generating the one or more sub-topic output classifications according to matching between the input vector and one or more terms in a sub-topic term repository; and supplying the input vector to a sub-topic supervised machine learning model to generate the one or more sub-topic output classifications.

19. The method of claim 18, further comprising training the sub-topic supervised machine learning model by:

creating a training data set based on other joined call data entries within a same output topic classification that have one assigned sub-topic output classification;

preprocessing the training data set to remove terms used for assigning the output topic classification and assigning the sub-topic output classification to each joined call data entry in the training data set for generation of a preprocessed training data set; and supplying the preprocessed training data set to the sub-topic supervised machine learning model to train the sub-topic supervised machine learning model using supervised learning.

20. The method of claim 13, further comprising obtaining each word confidence score data entry by comparing an audio waveform of a word associated with transcribed text of a call transcription data entry to an audio waveform of a target corresponding word in an automated transcription application database.

* * * * *